United States Patent
Aurifeille et al.

(10) Patent No.: US 10,712,008 B2
(45) Date of Patent: Jul. 14, 2020

(54) COMBUSTION CHAMBER AND A COMBUSTION CHAMBER FUEL INJECTOR SEAL

(71) Applicant: ROLLS-ROYCE plc, London (GB)

(72) Inventors: Emmanuel V. Aurifeille, Derby (GB); Nicholas M. Brown, Nottingham (GB); Murthy V V S Ravikanti, Derby (GB)

(73) Assignee: ROLLS-ROYCE PLC, London (GB)

( * ) Notice: Subject to any disclaimer, the term of this patent is extended or adjusted under 35 U.S.C. 154(b) by 346 days.

(21) Appl. No.: 15/723,592

(22) Filed: Oct. 3, 2017

(65) Prior Publication Data
US 2018/0106481 A1    Apr. 19, 2018

(30) Foreign Application Priority Data

Oct. 13, 2016    (GB) .................................. 1617369.2

(51) Int. Cl.
*F23R 3/28*    (2006.01)
*F23R 3/60*    (2006.01)
(Continued)

(52) U.S. Cl.
CPC ................ *F23R 3/283* (2013.01); *F02C 7/28* (2013.01); *F23R 3/60* (2013.01); *F23R 3/12* (2013.01);
(Continued)

(58) Field of Classification Search
CPC ...... F23R 3/04; F23R 3/10; F23R 3/12; F23R 3/283; F23R 3/50; F23R 3/60;
(Continued)

(56) References Cited

U.S. PATENT DOCUMENTS

| 4,365,470 A |   | 12/1982 | Matthews et al. |
| 4,914,918 A | * | 4/1990 | Sullivan .................. F23D 11/36 60/756 |

(Continued)

FOREIGN PATENT DOCUMENTS

| CN | 106016358 | 10/2016 |
| EP | 1882885 | 1/2008 |

(Continued)

OTHER PUBLICATIONS

Great Britain Search Report dated Jan. 27, 2017, issued in GB Patent Application No. 1617369.2.

(Continued)

*Primary Examiner* — Arun Goyal
(74) *Attorney, Agent, or Firm* — Oliff PLC (57) ABSTRACT

A combustion chamber comprises an upstream end wall, at least one fuel injector and at least one seal. Each fuel injector is arranged in a corresponding aperture in the wall. Each seal is arranged in a one of the apertures in the wall and around one of the fuel injectors. Each seal has a first portion, a second portion and a third portion. The second portion abuts the corresponding fuel injector. The third portion is arranged at the downstream end of the seal and increases in diameter in a downstream direction. The first portion is arranged upstream of the second portion and has a plurality of coolant apertures extending there-through. The coolant apertures extend through the first portion with axial, radial and tangential components. The seals produce better mixing between the coolant and the fuel and air mixture from the fuel injectors to reduce emissions produced in the combustion chamber.

20 Claims, 7 Drawing Sheets

(51) Int. Cl.
*F02C 7/28* (2006.01)
*F23R 3/12* (2006.01)
*F23R 3/50* (2006.01)

(52) U.S. Cl.
CPC ....... *F23R 3/50* (2013.01); *F23R 2900/00012* (2013.01); *F23R 2900/03044* (2013.01)

(58) Field of Classification Search
CPC .. F23R 2900/00012; F23R 2900/03041; F23R 2900/03042; F23R 2900/03044; F23R 3/00
See application file for complete search history.

(56) References Cited

U.S. PATENT DOCUMENTS

| 5,235,813 | A | 8/1993 | McVey et al. |
| 10,174,946 | B2* | 1/2019 | Cunha ............... F23R 3/002 |
| 2008/0000234 | A1 | 1/2008 | Commaret et al. |
| 2013/0199194 | A1* | 8/2013 | Carlisle ............... F23R 3/14 60/772 |
| 2014/0090382 | A1 | 4/2014 | Sandelis et al. |
| 2016/0061452 | A1 | 3/2016 | Walker et al. |
| 2016/0169522 | A1* | 6/2016 | Cunha ............... F23R 3/10 60/740 |

FOREIGN PATENT DOCUMENTS

| EP | 1975514 | 10/2008 |
| EP | 2014988 | 1/2009 |
| EP | 2362148 | 8/2011 |
| EP | 2518407 | 10/2012 |
| EP | 2518408 | 10/2012 |
| EP | 2710298 | 3/2014 |
| EP | 3026345 | 6/2016 |
| FR | 2948749 | 2/2011 |
| GB | 2134243 | 8/1984 |
| GB | 2511563 | 9/2014 |
| JP | 3346034 | 11/2002 |
| WO | 2012156631 | 11/2012 |

OTHER PUBLICATIONS

European Search Report dated Feb. 15, 2018, issued in EP Patent Application No. 17191289.

* cited by examiner

COMBUSTION CHAMBER AND A COMBUSTION CHAMBER FUEL INJECTOR SEAL

CROSS-REFERENCE TO RELATED APPLICATIONS

This specification is based upon and claims the benefit of priority from UK Patent Application Number 1617369.2 filed on 13 Oct. 2016, the entire contents of which are incorporated herein by reference.

BACKGROUND

1. Field of the Disclosure

The present disclosure relates to a combustion chamber and in particular to a gas turbine engine combustion chamber and also relates to a combustion chamber fuel injector seal and in particular to a gas turbine engine combustion chamber fuel injector seal.

2. Description of the Related Art

A combustion chamber comprises an upstream end wall, at least one annular wall, at least one fuel injector and at least one seal. The annular wall is secured to the upstream end wall and the upstream end wall has at least one aperture. Each fuel injector is arranged in a corresponding one of the apertures in the upstream end wall. Each seal is arranged in a corresponding one of the apertures in the upstream end wall and around the corresponding one of the fuel injectors. Each seal has a first portion, a second portion and a third portion. The second portion of each seal abuts the corresponding one of the fuel injectors. The third portion of each seal is arranged at the downstream end of the seal and the third portion increases in diameter in a downstream direction. The first portion of each seal is arranged upstream of the second portion and the first portion has a plurality of coolant apertures extending there-through.

The coolant apertures in the first portion of each seal direct the coolant there-through with axial and radial velocity components towards the third portion of the seal. The coolant is turned by the third portion of each seal such that it flows radially outwardly. The coolant directed radially outwardly by the third portion of each seal mixes with a fuel and air mixture supplied into the combustion chamber by the corresponding one of the fuel injectors.

However, the coolant supplied by the coolant apertures in each seal does not mix adequately with the fuel and air mixture supplied by the corresponding fuel injector and it is believed that the coolant supplied by the coolant apertures adversely affects the fuel and air mixture supplied by the corresponding fuel injector and hence adversely affects combustion of the fuel and air mixture in the combustion chamber. In particular, it is believed that the coolant supplied by the coolant apertures adversely affects the emission levels of the combustion chamber. It has been found, in combustion tests, that if the amount of coolant supplied by the coolant apertures is increased that there is an increased amount of smoke produced by the combustion chamber.

The present disclosure seeks to produce a combustion chamber and a combustion chamber fuel injector seal which reduces, or overcomes, the above mentioned problem.

SUMMARY

According to a first aspect of the present disclosure there is provided a combustion chamber comprising an upstream end wall, at least one annular wall, at least one fuel injector and at least one seal, the at least one annular wall being secured to the upstream end wall, the upstream end wall having at least one aperture, each fuel injector being arranged in a corresponding one of the apertures in the upstream end wall, each seal being arranged in a corresponding one of the apertures in the upstream end wall and around the corresponding one of the fuel injectors, each seal having an inner surface facing the corresponding one of the fuel injectors and an outer surface facing away from the corresponding one of the fuel injectors, each seal abutting the corresponding one of the fuel injectors, the downstream end of each seal increasing in diameter in a downstream direction, each seal having a plurality of coolant apertures extending there-through, each coolant aperture having an inlet in the inner surface and an outlet in the outer surface of the seal, the coolant apertures being arranged upstream of the downstream end of the seal, the coolant apertures extending there-through with axial, radial and tangential components, the outlet of each coolant aperture being axially spaced in a downstream direction from its inlet, the outlet of each coolant aperture being circumferentially spaced from its inlet and the outlet of each coolant aperture being radially spaced from its inlet.

The combustion chamber may be an annular combustion chamber comprising an annular upstream end wall, a radially inner annular wall, a radially outer annular wall, a plurality of fuel injectors and a plurality of seals and the annular upstream end wall having a plurality of apertures.

Each seal may have a first portion, a second portion and a third portion, the second portion abutting the corresponding one of the fuel injectors, the third portion being arranged at the downstream end of the seal, the third portion increasing in diameter in a downstream direction, the first portion being arranged upstream of the second portion, the first portion having a plurality of coolant apertures extending there-through, the coolant apertures extending through the first portion with axial, radial and tangential components.

Each seal may be circular in cross-section.

Each seal may comprise a substantially cylindrical first portion, a substantially cylindrical second portion and a frustoconical third portion or a bell mouth third portion.

The first portion of each seal may have an inner diameter greater than the inner diameter of the second portion of that seal.

The axes of the coolant apertures in the first portion of each seal may be arranged to intersect the third portion of the seal to direct coolant onto the third portion of the seal.

The third portion of each seal may have apertures extending there-through. The apertures may be angled with a tangential, or circumferential, component. The apertures may be angled with a tangential, or circumferential, component between and including 20° and 60°. The apertures may be not be angled radially. The apertures may be angled radially outwardly. The apertures may be angled radially inwardly.

The third portion of each seal may have a plurality of circumferentially spaced radially extending teeth at its downstream end at the maximum diameter of the third portion. The teeth may be angled with a tangential, or circumferential, component. The teeth may be angled with a tangential, or circumferential, component between and including 20° and 60°.

The third portion of each seal may have a plurality of circumferentially spaced radially extending corrugations at its downstream end. The corrugations may increase in amplitude in a radially outward direction. The corrugations may be angled with a tangential, or circumferential, component. The corrugations may be angled with a tangential, or circumferential, component between and including 20° and 60°. The corrugations define channels on the upstream and downstream surfaces of the third portion of the seal. The channels on the upstream and downstream surfaces of the third portion of the seal have tangential, or circumferential, components.

Each seal may comprise a fourth portion, the fourth portion of each seal being secured to the upstream end wall such that the seal may move radially with respect to the axis of the corresponding aperture in the upstream end wall.

The fuel injector may be a rich burn fuel injector or a lean burn fuel injector.

The combustion chamber may be a gas turbine engine combustion chamber.

The gas turbine engine may be an industrial gas turbine engine, an automotive gas turbine engine, a marine gas turbine engine or an aero gas turbine engine.

The aero gas turbine engine may be a turbofan gas turbine engine, a turbojet gas turbine engine, a turbo-propeller gas turbine engine or a turbo-shaft gas turbine engine.

According to a second aspect of the present disclosure there is provided a combustion chamber fuel injector seal having a downstream end, the downstream end of the seal increasing in diameter in a downstream direction, the seal having an inner surface arranged in operation to face a fuel injector and an outer surface arranged in operation to face away from the fuel injector, the seal having a plurality of coolant apertures extending there-through, each coolant aperture having an inlet in the inner surface and an outlet in the outer surface of the seal, the coolant apertures being arranged upstream of the downstream end of the seal, the coolant apertures extending there-through with axial, radial and tangential components, the outlet of each coolant aperture being axially spaced in a downstream direction from its inlet, the outlet of each coolant aperture being circumferentially spaced from its inlet and the outlet of each coolant aperture being radially spaced from its inlet.

The combustion chamber fuel injector seal may have a first portion, a second portion and a third portion, the third portion being arranged at the downstream end of the seal, the third portion increasing in diameter in a downstream direction, the first portion being arranged upstream of the second portion, the first portion having a plurality of coolant apertures extending there-through, the coolant apertures extending through the first portion with axial, radial and tangential components.

The seal may be circular in cross-section.

The seal may comprise a substantially cylindrical first portion, a substantially cylindrical second portion and a frustoconical third portion or a bell mouth third portion.

The first portion of the seal may have an inner diameter greater than the inner diameter of the second portion of the seal.

The axes of the coolant apertures in the first portion of the seal may be arranged to intersect the third portion of the seal to direct coolant onto the third portion of the seal.

The third portion of the seal may have apertures extending there-through. The apertures may be angled with a tangential, or circumferential, component. The apertures may be angled with a tangential, or circumferential, component between and including 20° and 60°. The apertures may be not be angled radially. The apertures may be angled radially outwardly. The apertures may be angled radially inwardly.

The third portion of the seal may have a plurality of circumferentially spaced radially extending teeth at its downstream end at the maximum diameter of the third portion. The teeth may be angled with a tangential, or circumferential, component. The teeth may be angled with a tangential, or circumferential, component between and including 20° and 60°.

The third portion of the seal may have a plurality of circumferentially spaced radially extending corrugations at its downstream end. The corrugations may increase in amplitude in a radially outward direction. The corrugations may be angled with a tangential, or circumferential, component. The corrugations may be angled with a tangential, or circumferential, component between and including 20° and 60°. The corrugations define channels on the upstream and downstream surfaces of the third portion of the seal. The channels on the upstream and downstream surfaces of the third portion of the seal have tangential, or circumferential, components.

The skilled person will appreciate that except where mutually exclusive, a feature described in relation to any one of the above aspects of the invention may be applied mutatis mutandis to any other aspect of the invention.

BRIEF DESCRIPTION OF THE DRAWINGS

Embodiments of the invention will now be described by way of example only, with reference to the Figures, in which.

DETAILED DESCRIPTION OF THE DISCLOSURE

Figure 1:
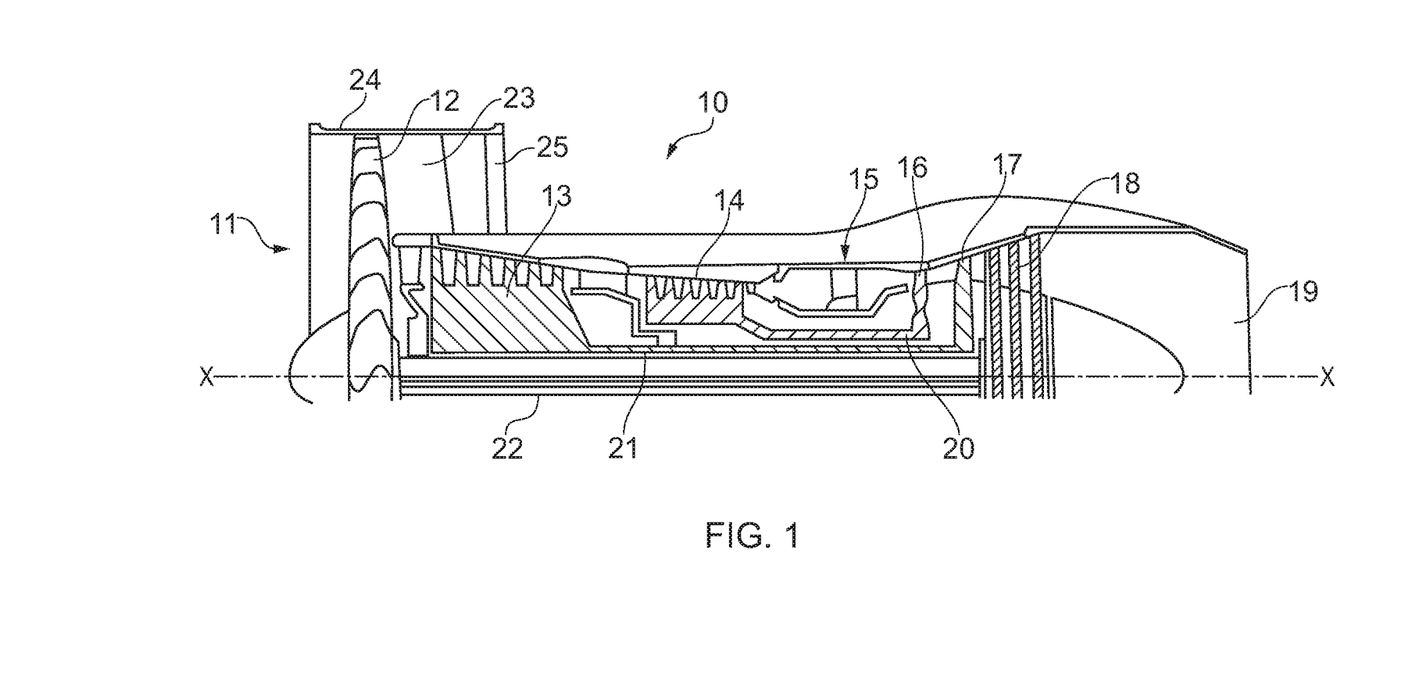
FIG. 1 is a sectional side view of a gas turbine engine having a combustion chamber according to the present disclosure.

With reference to FIG. 1, a gas turbine engine is generally indicated at 10, having a principal and rotational axis X-X.

The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A fan nacelle 24 generally surrounds the fan 12 and defines the intake 11 and a fan duct 23. The fan nacelle 24 is secured to the core engine by fan outlet guide vanes 25.

The gas turbine engine 10 works in the conventional manner so that air entering the intake 11 is compressed by the fan 12 to produce two air flows: a first air flow into the intermediate pressure compressor 13 and a second air flow which passes through the bypass duct 23 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, the intermediate pressure compressor 13 and the fan 12, each by suitable interconnecting shaft 20, 21 and 22 respectively.

Figure 2:
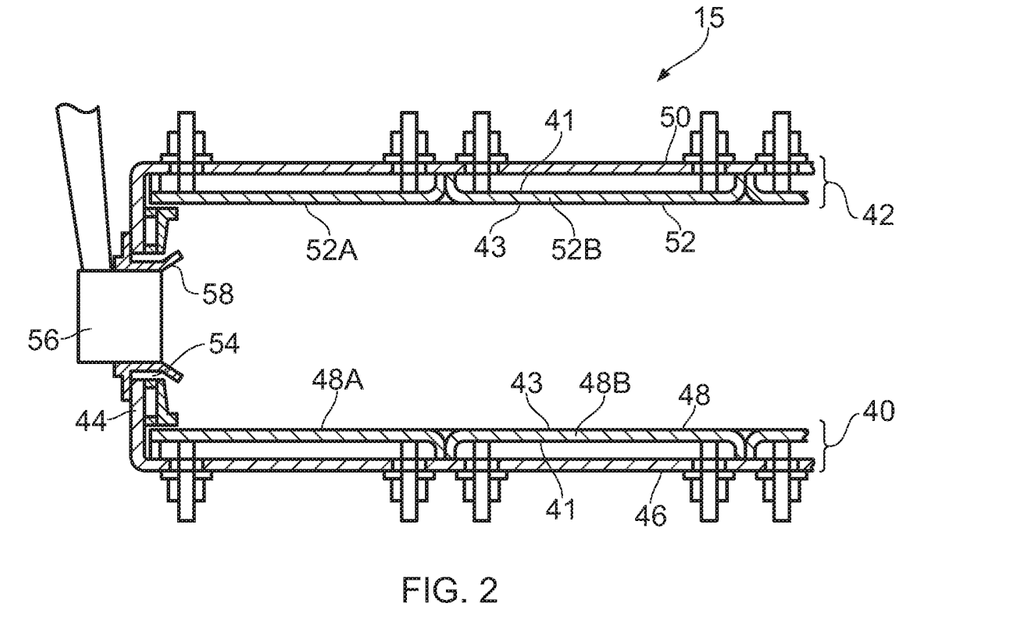
FIG. 2 is an enlarged cross-sectional view through a combustion chamber according to the present disclosure.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54. The combustion chamber 15 also comprises a plurality of fuel injectors 56 and a plurality of seals 58. Each fuel injector 56 is arranged in a corresponding one of the apertures 54 in the upstream end wall structure 44 and each seal 58 is arranged in a corresponding one of the apertures 54 in the upstream end wall structure 44 and each seal 58 is arranged around, e.g. surrounds, the corresponding one of the fuel injectors 56. The fuel injectors 56 are arranged to supply fuel into the annular combustion chamber 15 during operation of the gas turbine engine 10.

The second annular wall 48 comprises a plurality of rows of combustion chamber tiles 48A and 48B and the fourth annular wall 52 comprises a plurality of rows of combustion chamber tiles 52A and 52B. The combustion chamber tiles 48A and 48B are secured onto the first annular wall 46 by threaded studs, washers and nuts and the combustion chamber tiles 52A and 52B are secured onto the third annular wall 50 by threaded studs, washers and nuts.

Figure 3:
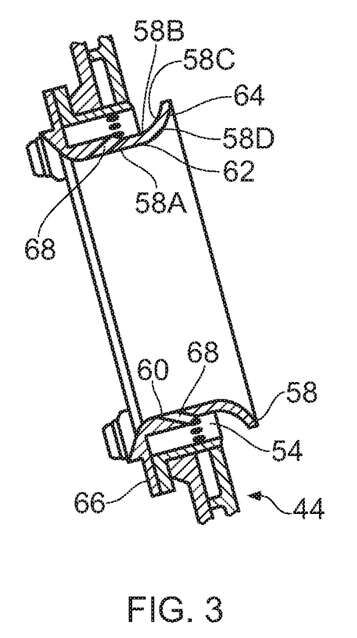
FIG. 3 is an enlarged cross-sectional view of a combustion chamber fuel injector seal according to the present disclosure.
Figure 4:
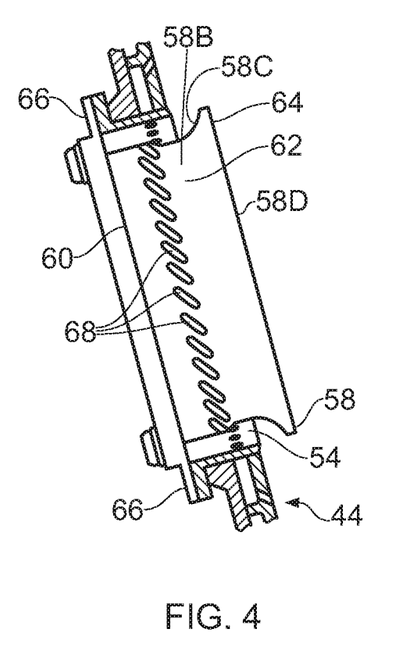
FIG. 4 is plan view of the combustion chamber fuel injector seal according to the present disclosure shown in FIG. 3.
Figure 5:
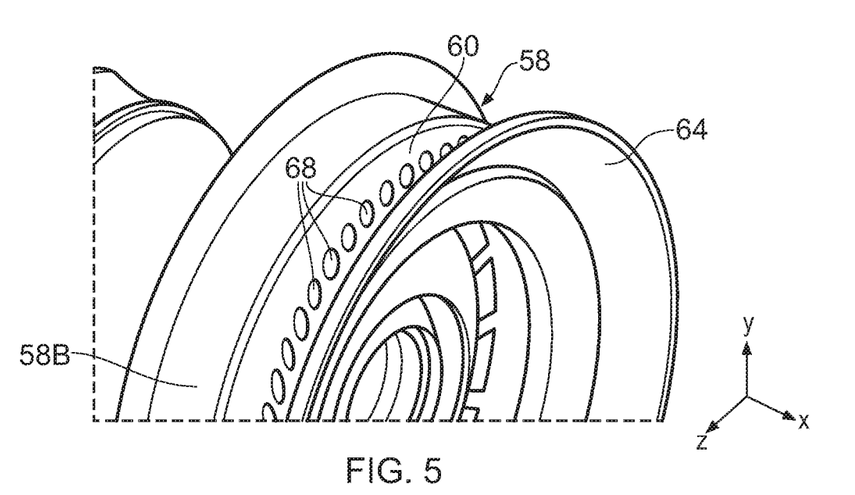
FIG. 5 is a perspective view of a portion of the combustion chamber fuel injector seal according to the present disclosure shown in FIG. 3.

FIGS. 3 to 5 show one of the seals 58 in more detail. Each seal 58 has a first portion 60, a second portion 62, a third portion 64 and a fourth portion 66. Each seal 58 has an inner surface 58A facing the corresponding one of the fuel injectors 56 and an outer surface 58B facing away from the corresponding one of the fuel injectors 56. The third portion 64 of each seal 58 has an upstream surface 58C and a downstream surface 58D. The second portion 62 of each seal 58 abuts and seals against the corresponding one of the fuel injectors 56. The first portion 60 of each seal 58 is arranged upstream of the second portion 62 and the third portion 64 of the seal 58 and is arranged downstream of the second portion 62 at the downstream end of the seal 58. The third portion 64 of each seal 58 increases in diameter in a downstream direction from the second portion 62 to a maximum diameter at the downstream end of the seal 58. The first portion 60 of each seal 58 has a plurality of coolant apertures 68 extending there-through and the coolant apertures 68 extend through the first portion 60 with axial, radial and tangential components. Each coolant aperture 68 has an inlet in the inner surface 58A and an outlet in the outer surface 58B of the seal 58. The outlet of each coolant aperture 68 is arranged axially spaced in a downstream direction from its inlet, the outlet of each coolant aperture 68 is arranged circumferentially spaced from its inlet and the outlet of each coolant aperture 68 is arranged radially spaced from its inlet.

Each seal 58 is circular in cross-section and comprises a substantially cylindrical first portion 60, a substantially cylindrical second portion 62 and a divergent, or flared, third portion 64. The third portion 64 may be frustoconical or may be a bell mouth. The first portion 60 of each seal 58 has an inner diameter greater than the inner diameter of the second portion 62 of that seal 58. The inner surface 58A is a radially inner surface and the outer surface 58B is a radially inner surface. The fourth portion 66 of each seal 58 is secured to the upstream end wall structure 44 such that the seal 58 may move radially and axially with respect to the axis of the corresponding aperture 54 in the upstream end wall structure 44. The fourth portion 66 of each seal 58 comprises a flange which extends radially from the first portion 60 of the seal 58. The fourth portion 66 of each seal 58 may for example be trapped between the upstream surface of the upstream end wall structure 44 and a ring which is removably secured to the upstream end wall structure 44, for example by nuts and bolts or nuts and studs.

The coolant apertures 68 typically have a diameter between and including 0.5 mm and 4 mm and the number of holes depends upon the diameter of the seal 58, but the circumferential spacing between cooling apertures 68 is not less than the diameter of the coolant apertures 68. The coolant apertures 68 are angled with a radial component between and including 10° and 70°. The coolant apertures 68 are angled with a tangential component so that the coolant from the coolant apertures 68 swirls in the same direction as the swirl of the swirling fuel and air mixture from the fuel injector 56. The coolant apertures 68 in the first portion 60 are angled with a tangential component to introduce a tangential velocity component to the coolant flowing therethrough so as to match, or closely match, the swirling fuel and air mixture from the associated fuel injector 56. The coolant flowing from the coolant apertures 68 may match the swirl or enhance the swirl of the fuel and air mixture from the fuel injector 56 to improve mixing. The coolant apertures 68 are angled with a tangential, or circumferential, component between and including 20° and 60°.

The seals 58 may be manufactured for example by casting and then drilling, e.g. ECM, EDM or laser drilling, the coolant apertures 68. The seals 58 may be manufactured by casting using cores to define the coolant apertures 68 and then removing, e.g. dissolving, the cores. Alternatively, the seals 58 may be manufactured by additive layer manufacturing, e.g. powder bed laser deposition.

Figure 6:
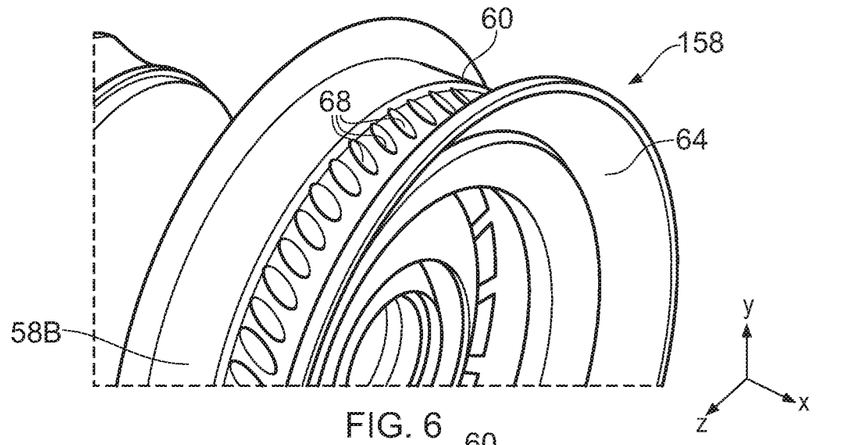
FIG. 6 is a perspective view of a portion of a further combustion chamber fuel injector seal according to the present disclosure.

FIG. 6 show a further one of the seals 158 in more detail. The seal 158 is substantially the same as the seal 58 in FIGS. 3 to 5 and like parts are denoted by like numerals. The seal 158 in FIG. 6 differs in that the axes of the coolant apertures 68 in the first portion 60 of the seal 158 are arranged to intersect the third portion 64 of the seal 158 to direct coolant onto the third portion 64 of the seal 158. The tangential component of the coolant apertures 68 in the seal 158 is less than the tangential component of the coolant apertures 68 in the seal 58. The coolant apertures 68 in the first portion 60 are angled with a tangential component to introduce a tangential velocity component to the coolant flowing there-through so as to match, or closely match, the swirling fuel and air mixture from the associated fuel injector 56. The coolant from the coolant apertures 68 in this arrangement impinges on the upstream surface 58C of the third portion 64 of the seal 58 to provide impingement cooling of the third portion 64. The seal 158 provides better cooling of the third portion 64 than the seal 58 in FIGS. 3 to 5 because the coolant apertures 68 in FIG. 6 produce less swirl than the coolant apertures 68 in FIGS. 3 to 5.

The seals 158 may be manufactured for example by casting and then drilling, e.g. ECM, EDM or laser drilling, the coolant apertures 68. The seals 158 may be manufactured by casting using cores to define the coolant apertures 68 and then removing, e.g. dissolving, the cores. Alternatively, the seals 158 may be manufactured by additive layer manufacturing, e.g. powder bed laser deposition.

Figure 7:
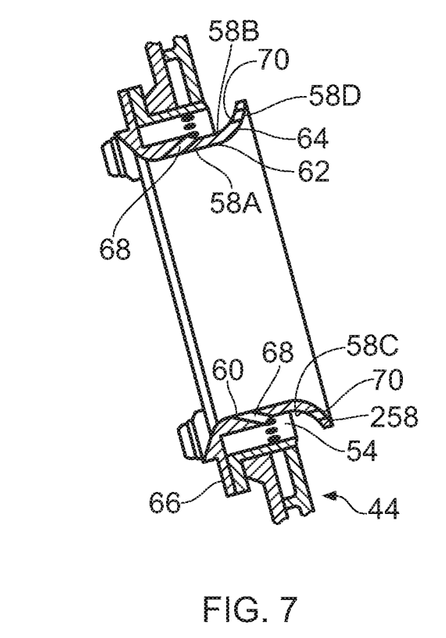
FIG. 7 is an enlarged cross-sectional view of another combustion chamber fuel injector seal according to the present disclosure.
Figure 8:
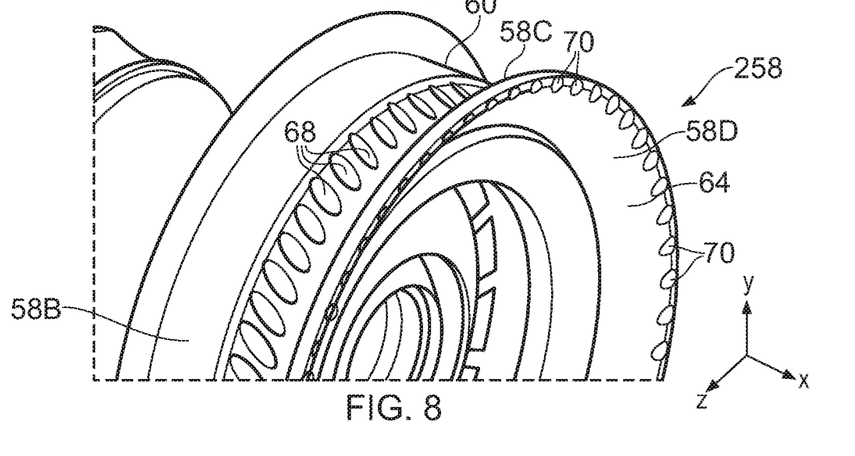
FIG. 8 is a perspective view of a portion of the combustion chamber fuel injector seal according to the present disclosure shown in FIG. 7.

FIGS. 7 and 8 show another one of the seals 258 in more detail. The seal 258 is substantially the same as the seal 158 in FIG. 6 and like parts are denoted by like numerals. The tangential component of the coolant apertures 68 in the first portion 60 of the seal 258 is less than the tangential component of the coolant apertures 68 in the seal 58 and the same as the tangential component of the coolant apertures 68 in the seal 158. The seal 258 differs in that the third portion 64 of the seal 258 has a plurality of apertures 70 extending there-through and the apertures 708 extend through the third portion 60 with axial and tangential components. Each aperture 70 has an inlet in an upstream surface 58C of the third portion 64 and an outlet in a downstream surface 58D of the third portion 64 of the seal 258. The outlet of each aperture 70 is arranged axially spaced in a downstream direction from its inlet and the outlet of each aperture 70 is arranged circumferentially spaced from its inlet.

The coolant apertures 68 in the first portion 60 are angled with a tangential component to introduce a tangential velocity component to the coolant flowing there-through so as to match, or closely match, the swirling fuel and air mixture from the associated fuel injector 56. The apertures 70 supply the coolant through the third portion 64 of the seal 258 into the combustion chamber 15 so that it mixes with the fuel and air mixture from the fuel injector 56 earlier to enhance mixing.

The apertures 70 typically have a diameter between and including 0.5 mm and 4 mm. The number of apertures 70 may be the same as the number of coolant apertures 68 or may be greater than the number of coolant apertures 68. The apertures 70 are angled with a tangential, or circumferential, component between and including 20° and 60°. The apertures 70 may or may not be angled radially. The apertures 70 may be angled radially outwardly so as to match, or closely match, the swirling fuel and air mixture from the associated fuel injector 56 and/or to provide better cooling of the downstream surface of the third portion 64 of the seal 58. Alternatively, the apertures 70 may be angled radially inwardly to encourage earlier mixing of the coolant with the fuel and air mixture from the fuel injector 56.

The seals 258 may be manufactured for example by casting and then drilling, e.g. ECM, EDM or laser drilling, the coolant apertures 68 and the apertures 70. The seals 258 may be manufactured by casting using cores to define the coolant apertures 68 and the apertures 70 and then removing, e.g. dissolving, the cores. Alternatively, the seals 258 may be manufactured by additive layer manufacturing, e.g. powder bed laser deposition.

Figure 9:
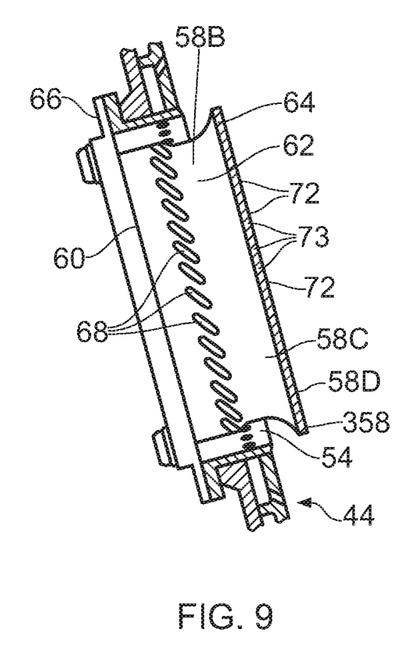
FIG. 9 is plan view of an additional combustion chamber fuel injector seal according to the present disclosure.
Figure 10:
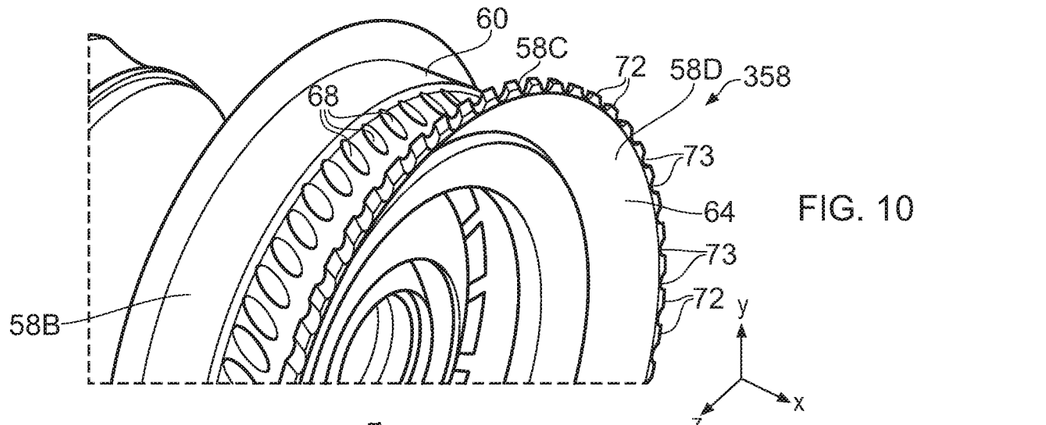
FIG. 10 is a perspective view of a portion of the additional combustion chamber fuel injector seal according to the present disclosure shown in FIG. 9.

FIGS. 9 and 10 show an additional one of the seals 358 in more detail. The seal 358 is substantially the same as the seal 158 in FIG. 6 and like parts are denoted by like numerals. The tangential component of the coolant apertures 68 in the first portion 60 of the seal 358 is less than the tangential component of the coolant apertures 68 in the seal 58 and the same as the tangential component of the coolant apertures 68 in the seal 158. The seal 358 differs in that the third portion 64 of the seal 358 is serrated at its downstream end at the maximum diameter of the third portion 64. The serrated downstream end comprises a plurality of circumferentially spaced radially extending teeth 72 which are separated by spaces, or slots, 73. The downstream end of the third portion 64 comprises a plurality of slots, 73 extending there-through and the slots 73 extend through the third portion 64 with axial and tangential components. Each slot 73 has an inlet in an upstream surface 58C of the third portion 64 and an outlet in a downstream surface 58D of the third portion 64 of the seal 358. The outlet of each slot 73 is arranged axially spaced in a downstream direction from its inlet and the outlet of each slot 73 is arranged circumferentially spaced from its inlet.

The coolant apertures 68 in the first portion 60 are angled with a tangential component to introduce a tangential velocity component to the coolant flowing there-through so as to match, or closely match, the swirling fuel and air mixture from the associated fuel injector 56. The teeth 72 and spaces, slots, 73 enhance the mixing between the coolant and the fuel and air mixture from the fuel injector 56. The teeth 72 and spaces, slots, 73 produce enhanced mixing of the coolant and the fuel and air mixture from the associated fuel injector 56 by introducing stream wise vorticity.

The teeth 72 and spaces, slots, 73 typically have a circumferential dimension between and including 0.5 mm and 4 mm and the teeth 72 have a radial dimension between and including 0.5 mm and 4 mm. The radially inner ends of the teeth 72 may be joined by a radius, as shown. The number of teeth 72 and slots 73 may be the same as the number of coolant apertures 68 or may be greater than the number of coolant apertures 68, e.g. two teeth, or two slots, per coolant aperture 68. The teeth 72 and slots 73 are angled with a tangential, or circumferential, component between and including 20° and 60°.

The seals 358 may be manufactured for example by casting and then drilling, e.g. ECM, EDM or laser drilling, the coolant apertures 68. The seals 358 may be manufactured by casting using cores to define the coolant apertures 68 and then removing, e.g. dissolving, the cores. The two above methods may or may not involve machining to form the slots 73 and the teeth 72. Alternatively, the seals 358 may be manufactured by additive layer manufacturing, e.g. powder bed laser deposition.

Figure 11:
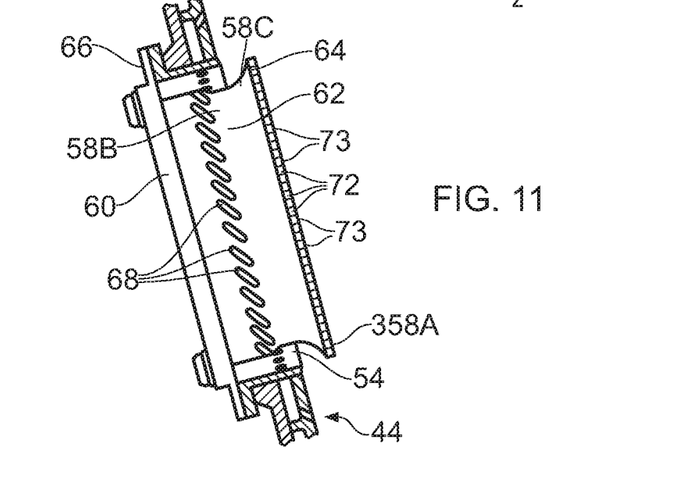
FIG. 11 is plan view of another combustion chamber fuel injector seal according to the present disclosure.

FIG. 11 shows another one of the seals 358A in more detail. The seal 358A is substantially the same as the seal 358 in FIGS. 9 and 10 and like parts are denoted by like numerals. The seal 358A differs in that the teeth 72 and slots 73 are not angled with a tangential, or circumferential, component.

The seals 358A may be manufactured for example by casting and then drilling, e.g. ECM, EDM or laser drilling, the coolant apertures 68. The seals 358A may be manufactured by casting using cores to define the coolant apertures 68 and then removing, e.g. dissolving, the cores. The two above methods may or may not involve machining to form the slots 73 and the teeth 72. Alternatively, the seals 358A may be manufactured by additive layer manufacturing, e.g. powder bed laser deposition.

Figure 12:
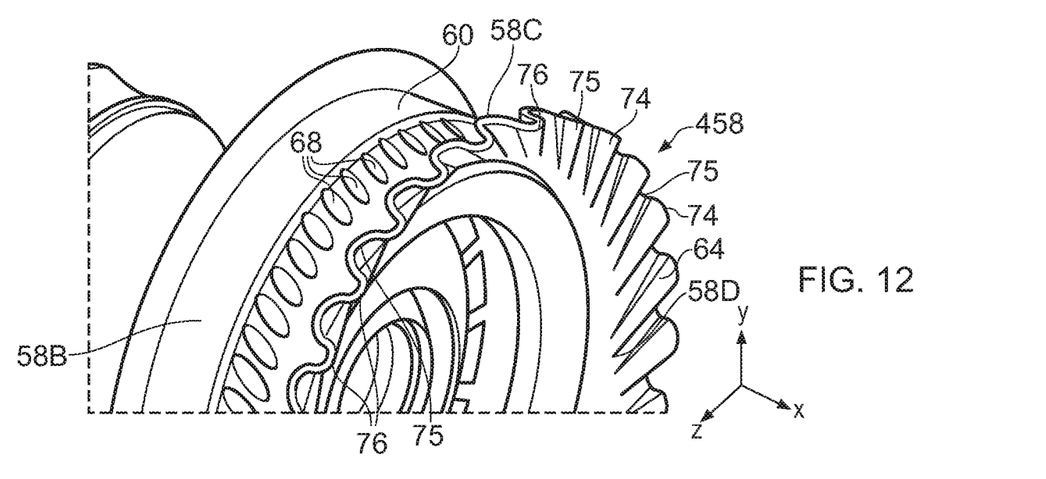
FIG. 12 is a perspective view of a portion of an alternative combustion chamber fuel injector seal according to the present disclosure.

FIG. 12 shows an additional one of the seals 458 in more detail. The seal 458 is substantially the same as the seal 158 in FIG. 6 and like parts are denoted by like numerals. The tangential component of the coolant apertures 68 in the first portion 60 of the seal 458 is less than the tangential component of the coolant apertures 68 in the seal 58 and the same as the tangential component of the coolant apertures 68 in the seal 158. The seal 458 differs in that the third portion 64 of the seal 458 has a plurality of circumferentially spaced radially extending corrugations, or lobes, 74 at its downstream end. The corrugations 74 increase in amplitude, or height, in a radially outward direction. Thus, the corrugations 74 form circumferentially alternating ridges 75 and grooves 76. The grooves 76 define channels on the upstream surface 58A of the third portion 64 of the seal 458 and the ridges 75 define channels on the downstream surface 58B of the third portion 64 of the seal 458. The corrugations 74 are angled with a tangential, or circumferential, component between and including 20° and 60°. Hence, the channels on the upstream and downstream surfaces 58C and 58D of the third portion 64 of the seal 458 defined by the grooves 76 and ridges 75 respectively have tangential, or circumferential, components of the same magnitude. It is to be noticed that the channels defined by the grooves 76 provides swirl on the upstream surface 58C of the third portion 64 of the seal 458 and the channels defined by the ridges 75 produce swirl on the downstream surface 58D of the third portion 64 of the seal 458 to enhance the swirling of the fuel air mixture before it mixes with the swirling coolant on the upstream surface of the seal 458.

The corrugations have radii of the order of 1 to 10 mm and have a radial dimension of up to 4 mm. The number of corrugations, or lobes, 74 may be the same as the number of coolant apertures 68 or if there is a large number of coolant apertures 68 there may be one corrugation 74 per coolant aperture 68.

The coolant apertures 68 in the first portion 60 are angled with a tangential component to introduce a tangential velocity component to the coolant flowing there-through so as to match, or closely match, the swirling fuel and air mixture from the associated fuel injector 56. The corrugations, or lobes, 74 enhance the mixing between the coolant and the fuel and air mixture from the fuel injector 56. The corrugations, or lobes, 74 produce enhanced mixing of the coolant and the fuel and air mixture from the associated fuel injector 56 by introducing stream wise vorticity.

The seals 458 may be manufactured by additive layer manufacturing, e.g. powder bed laser deposition.

Figure 13:
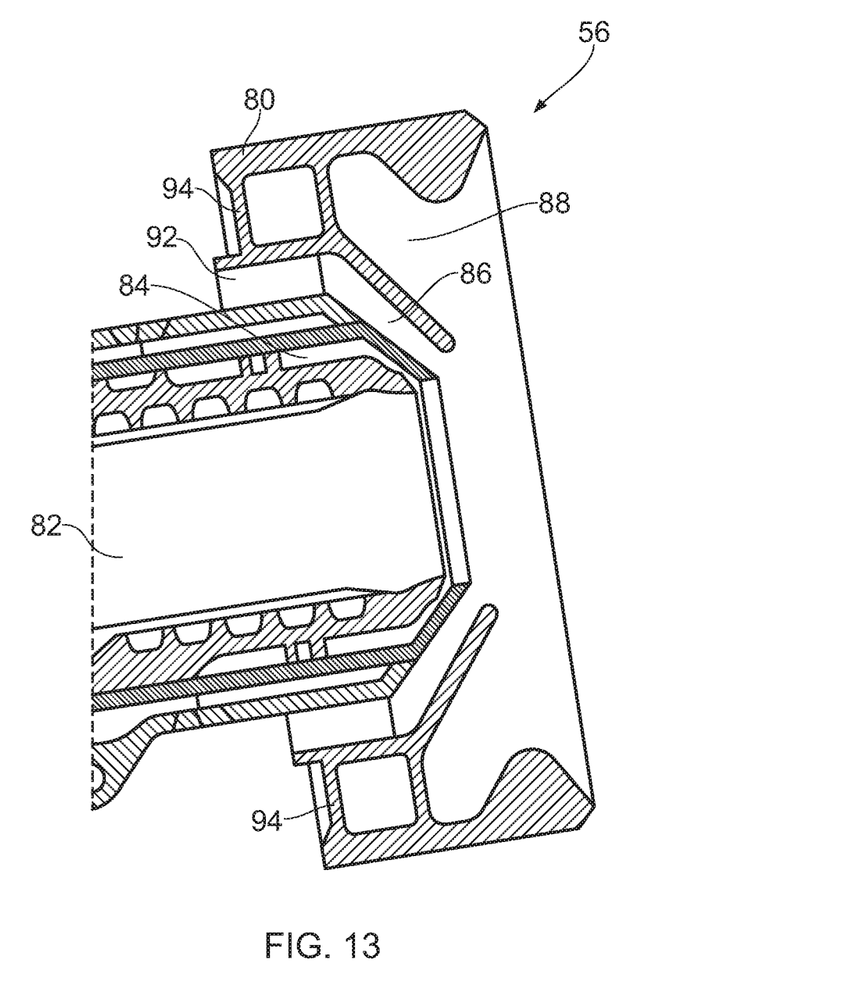
FIG. 13 is a cross-sectional view through a fuel injector shown in FIG. 2.

FIG. 13 shows a longitudinal cross-section through a rich burn fuel injector 56. The rich burn fuel injector 56 comprises a fuel feed arm and a fuel injector head 80. The fuel injector head 80 comprises an airblast fuel injector. The airblast fuel injector has, in order from radially inner to outer, a coaxial arrangement of an inner swirler air passage 82, a fuel passage 84, an intermediate air swirler passage 86 and an outer air swirler passage 88. The swirling air passing through the passages 82, 86, 88 of the fuel injector head 80 is high pressure and high velocity air derived from the high pressure compressor 14. Each swirler passage 82, 86, 88 has a respective swirler 92, 94 which swirls the air flow through that passage.

Figure 14:
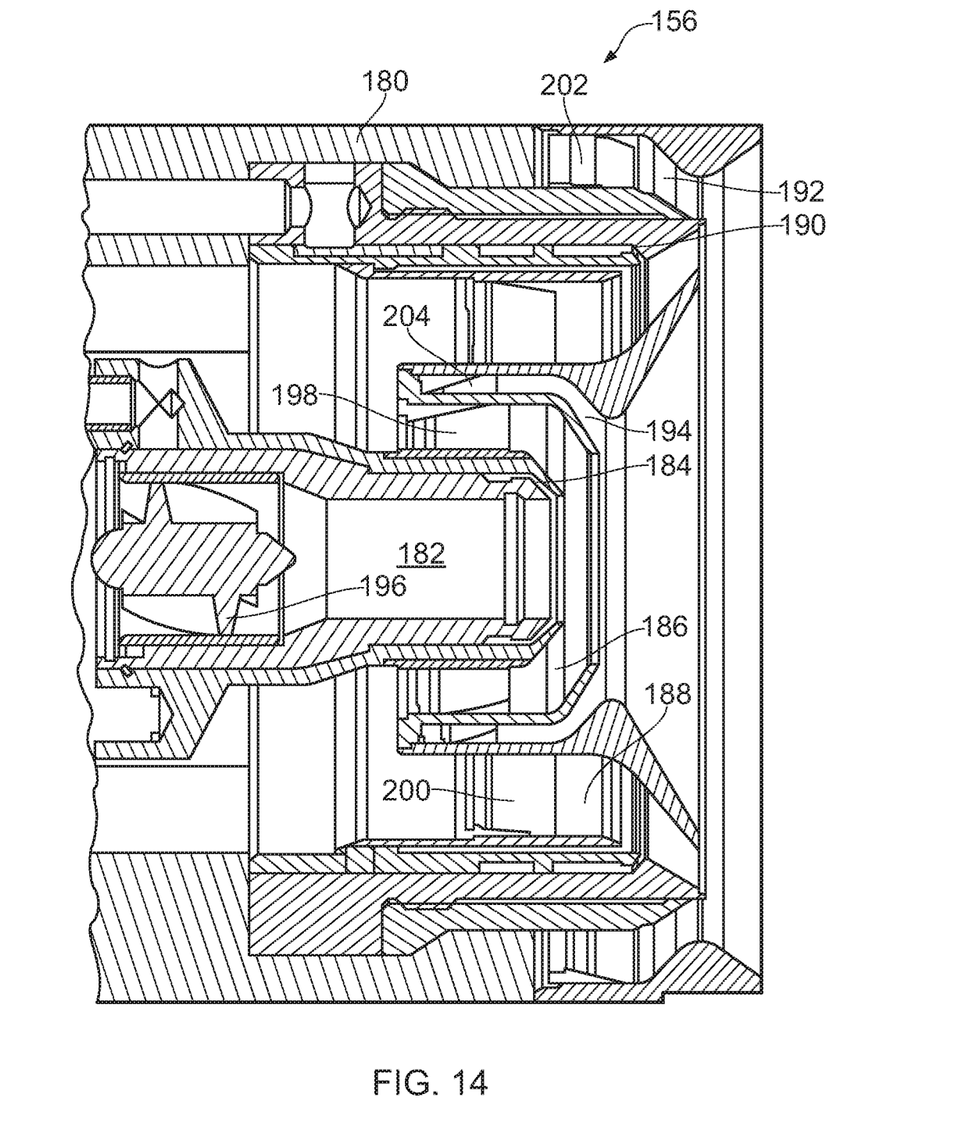
FIG. 14 is a cross-sectional view through an alternative fuel injector shown in FIG. 2.

FIG. 14 shows a longitudinal cross-section through a lean burn fuel injector 156. The lean burn fuel injector 156 comprises a fuel feed arm and a fuel injector head 180. The fuel injector head 180 has a coaxial arrangement of an inner pilot airblast fuel injector and an outer mains airblast fuel injector. The pilot airblast fuel injector has, in order from radially inner to outer, a coaxial arrangement of a pilot inner swirler air passage 182, a pilot fuel passage 184, and a pilot outer air swirler passage 186. The mains airblast fuel injector has, in order from radially inner to outer, a coaxial arrangement of a mains inner swirler air passage 188, a mains fuel passage 190, and a mains outer air swirler passage 192. An intermediate air swirler passage 194 is sandwiched between the outer air swirler passage 186 of the pilot airblast fuel injector and the inner swirler air passage 188 of the mains airblast fuel injector. The swirling air passing through the passages 182, 186, 188, 192, 194 of the fuel injector head 180 is high pressure and high velocity air derived from the high pressure compressor 14. Each swirler passage 182, 186, 188, 192, 194 has a respective swirler 196, 198, 200, 202, 204 which swirls the air flow through that passage.

Each of the fuel injector heads 80, 180 may have a portion which has part spherical surface so to abut and seal against the inner surface of the second portion 62 of the associated seal 58.

Although the present disclosure has been described with reference to an annular combustion chamber it is equally applicable to a tubular combustion chamber comprising an upstream end wall and an annular wall and the upstream end wall has a single aperture with a fuel injector and a seal or to a can annular combustion chamber arrangement comprising a plurality of circumferentially spaced tubular combustion chambers each comprising an upstream end wall and an annular wall and the upstream end wall of each tubular combustion chamber has a single aperture with a fuel injector and a seal.

The combustion chamber may be a gas turbine engine combustion chamber.

The gas turbine engine may be an industrial gas turbine engine, an automotive gas turbine engine, a marine gas turbine engine or an aero gas turbine engine.

The aero gas turbine engine may be a turbofan gas turbine engine, a turbojet gas turbine engine, a turbo-propeller gas turbine engine or a turbo-shaft gas turbine engine.

The advantage of the present disclosure is that the seals produce better mixing between the coolant and the fuel and air mixture from the fuel injectors to reduce emissions produced in the combustion chamber. In each of the different seal arrangements the seal enhances mixing of the coolant from the coolant apertures with the fuel and air mixture from the associated fuel injector by introducing a tangential velocity component to the coolant flow from the coolant apertures in the seal so that it matches, or more closely matches, the swirling fuel and air mixture from the fuel injector. In some of the different seal arrangements further mixing is achieved by providing apertures in the third, frustoconical or bell mouth, portion of the seal, by providing serrations at the downstream end of the third, frustoconical or bell mouth, portion of the seal or by providing lobes at the downstream end of the third, frustoconical or bell mouth, portion of the seal.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A combustion chamber comprising:
an upstream end wall,
an annular wall,
a fuel injector and
a seal,
the annular wall being secured to the upstream end wall,
the upstream end wall having an aperture,
the fuel injector being arranged in the aperture in the upstream end wall,
the seal being arranged in the aperture in the upstream end wall and around the fuel injector,
the seal having an inner surface with an inner diameter and facing the fuel injector and an outer surface with an outer diameter and facing away from the fuel injector, the outer diameter being larger than the inner diameter,
the seal abutting the fuel injector,
a downstream end of the seal increasing in diameter in a downstream direction, the seal having a plurality of coolant apertures extending there-through,
each of the plurality of coolant apertures having an inlet in the inner surface and an outlet in the outer surface, the outlet being downstream of the inlet,
the plurality of coolant apertures being arranged upstream of the downstream end of the seal,
the plurality of coolant apertures extending through the seal with axial, radial and tangential components,
the outlet being axially spaced in a downstream direction from the inlet,
the outlet being circumferentially spaced from the inlet, and
the outlet being radially spaced from the inlet.

2. A combustion chamber as claimed in claim 1 wherein the combustion chamber is an annular combustion chamber comprising the annular upstream end wall, a radially inner annular wall, a radially outer annular wall, a plurality of the fuel injector and a plurality of the seal and the annular upstream end wall having a plurality of the aperture.

3. A combustion chamber as claimed in claim 1 wherein the seal has a first portion, a second portion and a third portion, the second portion abutting the fuel injector, the third portion being at the downstream end of the seal, the third portion increasing in diameter in a downstream direction, the first portion being upstream of the second portion, the first portion having the plurality of coolant apertures extending there-through with the axial, radial and tangential components.

4. A combustion chamber as claimed in claim 3 wherein the seal is circular in cross-section, the first portion is substantially cylindrical, the second portion is substantially cylindrical and the third portion is frustoconical or a bell mouth.

5. A combustion chamber as claimed in claim 3 wherein the first portion of the seal has a first inner diameter greater than a second inner diameter of the second portion of the seal.

6. A combustion chamber as claimed in claim 3 wherein the axes of the plurality of coolant apertures in the first portion of the seal intersect the third portion of the seal to direct coolant onto the third portion of the seal.

7. A combustion chamber as claimed in claim 3 wherein the third portion of the seal has the plurality of coolant apertures extending there-through.

8. A combustion chamber as claimed in claim 3 wherein the third portion of the seal has a plurality of circumferentially spaced radially extending teeth at the downstream end at a maximum diameter of the third portion.

9. A combustion chamber as claimed in claim 3 wherein the third portion of each seal has a plurality of circumferentially spaced radially extending corrugations at the downstream end.

10. A combustion chamber as claimed in claim 3 wherein the seal comprises a fourth portion, the fourth portion of the seal being secured to the upstream end wall such that the seal may move radially with respect to an axis of the aperture in the upstream end wall.

11. A combustion chamber as claimed in claim 1 wherein the fuel injector is a rich burn fuel injector or a lean burn fuel injector.

12. A combustion chamber as claimed in claim 1 wherein the combustion chamber is a gas turbine engine combustion chamber.

13. A combustion chamber fuel injector seal comprising:
a downstream end, the downstream end of the seal increasing in diameter in a downstream direction,
an inner surface with an inner diameter and configured to face and abut a fuel injector,
an outer surface with an outer diameter and configured to face away from the fuel injector, the outer diameter being larger than the inner diameter,
a plurality of coolant apertures extending through the seal,
each of the plurality of coolant apertures having an inlet in the inner surface and an outlet in the outer surface, the outlet being downstream of the inlet,
the plurality of coolant apertures being upstream of the downstream end of the seal,
the plurality of coolant apertures extending through the seal with axial, radial and tangential components,
the outlet being axially spaced in a downstream direction from the inlet,
the outlet being circumferentially spaced from the inlet, and
the outlet being radially spaced from the inlet.

14. A combustion chamber fuel injector seal as claimed in claim 13 having a first portion, a second portion and a third portion, the third portion being at the downstream end of the seal, the third portion increasing in diameter in a downstream direction, the first portion being upstream of the second portion, the first portion having the plurality of coolant apertures extending there-through with the axial, radial and tangential components.

15. A combustion chamber fuel injector seal as claimed in claim 14 wherein the seal is circular in cross-section, the first portion is substantially cylindrical, the second portion is substantially cylindrical and the third portion is frustoconical or a bell mouth.

16. A combustion chamber fuel injector seal as claimed in claim 14 wherein the first portion of the seal has a first inner diameter greater than a second inner diameter of the second portion of the seal.

17. A combustion chamber fuel injector seal as claimed in claim 14 wherein the axes of the plurality of coolant apertures in the first portion of the seal intersect the third portion of the seal to direct coolant onto the third portion of the seal.

18. A combustion chamber fuel injector seal as claimed in claim 14 wherein the third portion of the seal has the plurality of coolant apertures extending there-through.

19. A combustion chamber fuel injector seal as claimed in claim 14 wherein the third portion of the seal has a plurality of circumferentially spaced radially extending teeth at the downstream end at a maximum diameter of the third portion.

20. A combustion chamber fuel injector seal as claimed in claim 14 wherein the third portion of the seal has a plurality of circumferentially spaced radially extending corrugations at the downstream end.

* * * * *